United States Patent
Du

(10) Patent No.: US 11,205,913 B2
(45) Date of Patent: Dec. 21, 2021

(54) METHOD AND APPARATUS FOR CONTROLLING CHARGE

(71) Applicant: BEIJING XIAOMI MOBILE SOFTWARE CO., LTD., Beijing (CN)

(72) Inventor: Sihong Du, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 130 days.

(21) Appl. No.: 16/699,624

(22) Filed: Nov. 30, 2019

(65) Prior Publication Data

US 2021/0013730 A1 Jan. 14, 2021

(30) Foreign Application Priority Data

Jul. 9, 2019 (CN) .......................... 201910613764.0

(51) Int. Cl.
*H02J 7/00* (2006.01)

(52) U.S. Cl.
CPC ...... *H02J 7/00712* (2020.01); *H02J 7/00302* (2020.01)

(58) Field of Classification Search
CPC .................................................. H02J 7/00712
USPC ........................................................ 320/137
See application file for complete search history.

(56) References Cited

U.S. PATENT DOCUMENTS

| 4,885,523 A * | 12/1989 | Koenck ................ H02J 7/0068 320/131 |
| 6,337,560 B1 * | 1/2002 | Kalogeropoulos ... H02J 7/0071 320/160 |
| 2014/0167706 A1 * | 6/2014 | Sun .................... H02J 7/007184 320/160 |
| 2016/0036258 A1 * | 2/2016 | Tsutsui ...................... H02J 7/04 320/107 |
| 2018/0145527 A1 | 5/2018 | Ravi et al. |

FOREIGN PATENT DOCUMENTS

CN 106785132 A 5/2017

OTHER PUBLICATIONS

European Patent Office, Extended European Search Report mailed in Application No. 19217217.9, dated Jan. 23, 2020, Germany, 8 pages.

* cited by examiner

*Primary Examiner* — Yalkew Fantu
(74) *Attorney, Agent, or Firm* — Syncoda LLC; Feng Ma

(57) ABSTRACT

A method for controlling charging includes: determining charge cycle counts of a battery; obtaining a set charge cut-off current corresponding to the charge cycle counts based on a preset charge strategy; adjusting a charge cut-off current of the battery according to the set charge cut-off current corresponding to the charge cycle counts to control a charge volume of the battery.

18 Claims, 3 Drawing Sheets

---

Determine charge cycle counts of a battery — S101

Obtain a set charge cut-off current corresponding to the charge cycle counts based on a preset charge strategy — S103

Adjust a charge cut-off current of the battery according to the set charge cut-off current corresponding to the charge cycle counts to control a charge volume of the battery — S105

METHOD AND APPARATUS FOR CONTROLLING CHARGE

CROSS-REFERENCE TO RELATED APPLICATION

This application claims priority to Chinese Patent Application No. 201910613764.0 filed on Jul. 9, 2019, the disclosure of which is hereby incorporated by reference in its entirety.

BACKGROUND

Battery durability has always been an important concern for consumers. Batteries used currently are usually polymer lithium ion batteries. Along with use in electronic products such as mobile phones, irreversible reaction occurs in the polymer lithium ion batteries, such that the battery durability is gradually decreased.

SUMMARY

The present disclosure relates generally to the fields of charge technologies, and more specifically to a method and an apparatus for controlling charging.

According to a first aspect of the present disclosure, a method of controlling charge is provided, including: determining charge cycle counts of a battery; obtaining a set charge cut-off current corresponding to the charge cycle counts based on a preset charge strategy; and adjusting a charge cut-off current of the battery according to the set charge cut-off current corresponding to the charge cycle counts to control a charge volume of the battery.

According to a second aspect of the present disclosure, an apparatus for controlling charge is provided, including: a collecting module, configured to determine a charge cycle count of a battery; an obtaining module, configured to obtain a set charge cut-off current corresponding to the charge cycle count based on a preset charge strategy; and a controlling module, configured to adjust a charge cut-off current of the battery according to the set charge cut-off current corresponding to the charge cycle counts to control a charge volume of the battery.

According to a third aspect of the present disclosure, an apparatus for controlling charge is provided, including: one or more processors; and a memory storing processor-executable instructions. The one or more processors are configured to: determine charge cycle counts of a battery; obtain a set charge cut-off current corresponding to the charge cycle counts based on a preset charge strategy; and adjusting a charge cut-off current of the battery according to the obtained set charge cut-off current corresponding to the charge cycle counts to control a charge volume of the battery.

It is understood that the above general descriptions and subsequent detailed descriptions are merely illustrative and explanatory and shall not be intended to limit the present disclosure.

DETAILED DESCRIPTION

The present disclosure will be detailed below in combination with specific examples shown in drawings. However, these examples are not intended to limit the present disclosure. Transformations made by those skilled in the prior art for structures, methods and functions based on these examples shall fall within the scope of protection of the present disclosure.

The terms used in the present disclosure are for the purpose of describing particular examples only, and are not intended to limit the present disclosure. Terms determined by "a", "the" and "said" in their singular forms in the present disclosure and the appended claims are also intended to include plurality or multiple, unless clearly indicated otherwise in the context. It should also be understood that the term "and/or" as used herein is and includes any and all possible combinations of one or more of the associated listed items.

Some examples of the present disclosure will be detailed below in combination with accompanying drawings. In a case of no conflict, the following examples and features in the examples may be combined mutually.

Figure 1:
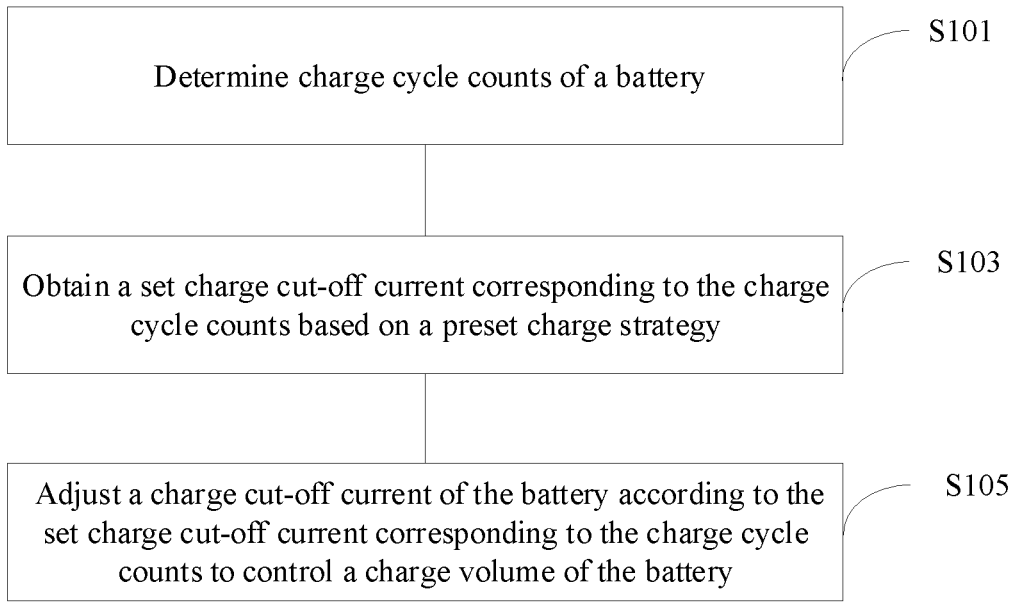
FIG. 1 is a flowchart illustrating a method of controlling charge according to an example of the present disclosure.

An example of the present disclosure provides a method of controlling charge, which may be applied to any terminal with a rechargeable battery, such as a smart phone, a tablet computer, a laptop computer, a personal digital assistant, a medical device, a lighting device and the like. Generally, the rechargeable battery is a polymer lithium ion battery, and the present disclosure does not limit the type of the rechargeable battery, as long as the method of controlling charge in the present disclosure works on the rechargeable battery. FIG. 1 is a flowchart illustrating a method of controlling charge according to an example of the present disclosure. As shown in FIG. 1, the method may include the following steps S101-S103.

At step S101, charge cycle counts of a battery are determined.

At step S101, the terminal records the charge cycle counts of the battery by obtaining an accumulation of battery charge volumes. One complete charge cycle refers to a process of full charge and full discharge of the battery.

At step S103, a set charge cut-off current corresponding to the charge cycle counts is obtained based on a preset charge strategy.

With the continuous increase of charge cycle counts, irreversible reaction occurs in the battery. Therefore, the battery will gradually age and the durability of the battery will also gradually decrease. At step S103, set charge cut-off currents corresponding to different charge cycle counts are preset based on the preset charge strategy. In this way, a set charge cut-off current corresponding to the charge cycle counts is obtained, where the set cut-off current is a current value when the battery reaches full charge state or a certain charge state.

At this step, the preset charge strategy specifically includes: for each increase of N cycles, increasing the set charge cut-off current by X milliamperes based on an initial charge cut-off current, where N and X are respectively natural numbers. After the charge cycle counts reach a threshold, the set charge cut-off current reaches a maximum value.

In an example, when a terminal is charged for the first time, the charge cut-off current is set to 100 mA. When the charge cycle counts are 100, the charge cut-off current is increased to 125 mA. When the charge cycle counts are 200, the charge cut-off current is increased to 150 mA, and so on, the charge cut-off current is increased by 25 mA for each increase of 100 cycles. When the charge cycle counts reach the threshold of 500 cycles, the maximum of the charge cut-off current is 200 mA correspondingly. The charge cut-off currents corresponding to the charge cycle counts are described below:

when the charge cycle count is 1-100, the charge cut-off current is 100 mA;

when the charge cycle count is 101-200, the charge cut-off current is 125 mA;

when the charge cycle count is 201-300, the charge cut-off current is 150 mA;

when the charge cycle count is 301-400, the charge cut-off current is 175 mA;

when the charge cycle count is 401-500, the charge cut-off current is 200 mA;

when the charge cycle count is above 501, the charge cut-off current is 200 mA.

As described above, the increase of the charge cut-off current may lead to the reduction of the charge capacity of the battery. However, the increase of the charge cut-off current may effectively improve the occurrence of side reaction on a surface of the battery, thereby prolonging the use life of the battery.

At step S105, a charge cut-off current of the battery is adjusted based on the set charge cut-off current corresponding to the charge cycle counts to control a charge volume of the battery.

At step S105, based on the preset charge strategy in the method of controlling charge, the cut-off current of the battery is adjusted according to the set charge cut-off current corresponding to the charge cycle count, so that the charge volume of the battery is controlled. In this example, shallow charge may be performed for the battery by controlling the charge volume through adjusting the charge cut-off current, which may effectively improve the aging and overcharging of the battery and optimize the Solid Electrolyte Interphase (SEI) film of the cathode of the battery, thereby effectively increasing the cycle life of the battery.

Figure 2:
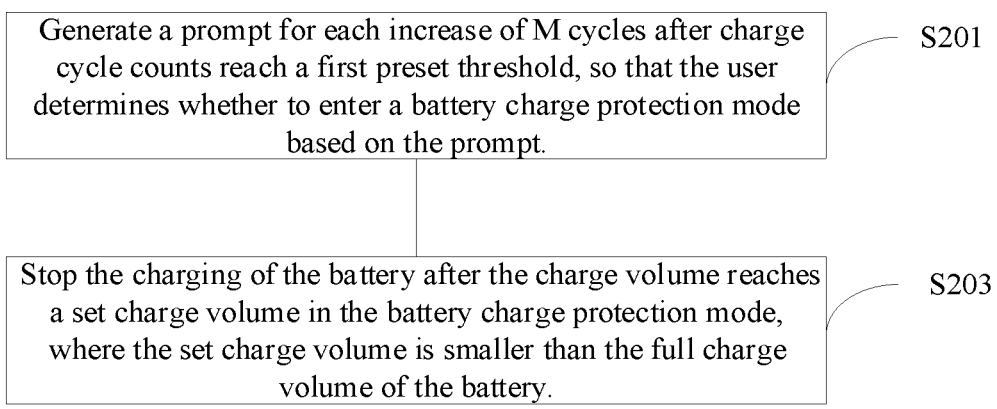
FIG. 2 is a flowchart illustrating another method of controlling charge according to an example of the present disclosure.

As shown in FIG. 2, in another example, the method of controlling charge further includes the following steps S201-S203.

At step S201, after the charge cycle counts reach a first preset threshold, a prompt is generated for each increase of M cycles, so that a user determines whether to enter a battery charge protection mode based on the prompt.

At step S203, in the battery charge protection mode, the charging of the battery is stopped after the charge volume reaches a set charge volume, where the set charge volume is smaller than the full charge volume of the battery and M is a natural number.

In an example, to prolong a use life of the battery, the method of controlling charge according to the present disclosure may perform intelligent charge strategy selection according to the use requirements of the user. In the method of controlling charge, after the charge cycle counts of the battery reach the first preset threshold (fixed counts, for example 200 cycles), a prompt is generated for each increase of M cycles (for example, 50 cycles) so that the user determines whether to enter the battery charge protection mode. If the user needs to go to an environment where the terminal device of the user cannot be charged, the battery of the terminal device may be charged to full. If the user does not require that the battery is charged to full, the battery charge protection mode may be selected, that is, the charging of the battery is stopped after the charge volume reaches the set charge volume. The set charge volume is 70%-90% of the full charge volume. Preferably, the set charge volume is 80%-90% of the full charge volume.

Figure 3:
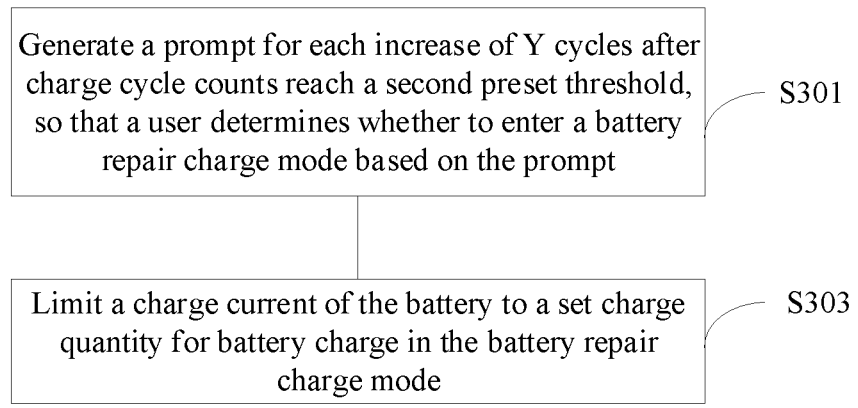
FIG. 3 is a flowchart illustrating another method of controlling charge according to an example of the present disclosure.

Further, as shown in FIG. 3, the method of controlling charge according to the present disclosure further includes the following steps S301-S303.

At step S301, after the charge cycle counts reach a second preset threshold (in an example, the second preset threshold is a fixed value), a prompt is generated for each increase of Y cycles, so that the user determines whether to enter the battery repair charge mode.

At step S303, in the battery repair charge mode, a charge current of the battery is limited to a set charge current for battery charge. The charge current is a current charging for the battery, and the set charge current is lower than the charge current of the battery in a battery non-repair charge mode.

In this example, the user may select a current-limited charge or a normal charge or the like based on its own requirements. Through the intelligent charge strategy selection, the user may repair the battery by using a lower current for charging on a condition that a relatively long charge time is allowed, so as to prolong the use life of the battery. Further, the use life of a mobile phone having the battery is prolonged and the user experiences are greatly improved.

Y is a natural number which is same as or different from M. In a case that there is no limitation both in the charge time and the charge environment, the user may determine whether to perform a full charge according to the method of controlling charge of the present disclosure. Meanwhile, the user may determine whether to perform a current-limited charge to repair the battery, in other words, the battery may reach a non-full charge, such as 90% of the full charge, in a manner of current-limited charging selected by the user.

In the present disclosure, by adjusting the charge manner, the aging and overcharging of the battery are effectively improved and the SEI film of the cathode of the battery is optimized. In this way, a use life of the battery is greatly improved without affecting the use of the user, thereby solving the problem that the battery is not durable after a long time of use.

Corresponding to the examples of the above method, the present disclosure further provides an example of an apparatus for controlling charge.

Figure 4:
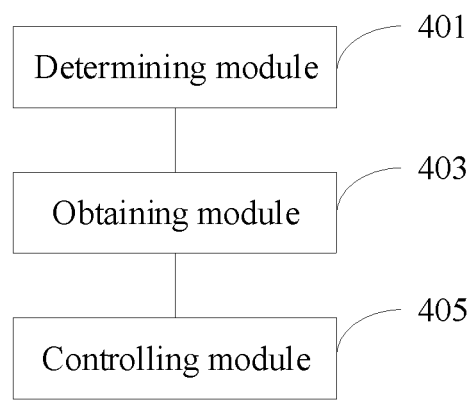
FIG. 4 is a block diagram illustrating a structure of an apparatus for controlling charge according to an example of the present disclosure.

FIG. 4 is a block diagram illustrating a structure of an apparatus for controlling charge according to an example of the present disclosure. The apparatus for controlling charge includes:

a determining module 401, configured to determine charge cycle counts of a battery;

an obtaining module 403, configured to obtain a set charge cut-off current corresponding the charge cycle counts based on a preset charge strategy; and a controlling module 405, configured to adjust a charge cut-off current of the battery based on the set charge cut-off current corresponding to the charge cycle counts to control a charge volume of the battery.

The various circuits, device components, modules, units, blocks, or portions may have modular configurations, or are composed of discrete components, but nonetheless can be referred to as "units," "modules," or "portions" in general. In other words, the "circuits," "components," "modules," "blocks," "portions," or "units" referred to herein may or may not be in modular forms.

In the apparatus for controlling charge according to the present disclosure, the terminal records the charge cycle counts of the battery by obtaining an accumulation of battery charge volumes. One complete charge cycle refers to a process of full charge and full discharge of the battery.

With the continuous increase of charge cycle counts, irreversible reaction occurs in the battery. Therefore, the battery will gradually age and the durability of the battery will also gradually decrease. Charge cut-off currents corresponding to different charge cycle counts are preset based on the preset charge strategy. In this way, a set charge cut-off current corresponding to the charge cycle counts is obtained, where the set cut-off current is a current value when the battery reaches full charge state or a certain charge state.

In this example, the obtaining module includes a first processing module. When the preset charge strategy is performed by the first processing module, the first processing module is configured to increase the set charge cut-off current by X milliamperes based on an initial charge cut-off current for each increase of N cycles, where N and X are respectively natural numbers. After the charge cycle counts reach a threshold, the set charge cut-off current reaches a maximum value. Based on the preset charge strategy of the apparatus for controlling charge, the cut-off current of the battery is adjusted according to the charge cut-off current corresponding to the charge cycle count, so that the charge volume of the battery is controlled.

In another example of the apparatus for controlling charge according to the present disclosure, the apparatus further includes:

a second processing module configured to generate a prompt for each increase of M cycles after the charge cycle counts reach a first preset threshold, so that a user determines whether to enter a battery charge protection mode based on the prompt, where the charging of the battery is stopped after the charge volume reaches a set charge volume in the battery charge protection mode. The set charge volume is smaller the full charge volume of the battery.

In an example, to prolong a use life of the battery, the apparatus for controlling charge according to the present disclosure may perform intelligent charge strategy selection according to the use requirements of the user. In the apparatus for controlling charge, after the charge cycle counts of the battery reach the first preset threshold (fixed counts, for example 200 cycles), a prompt is generated for each increase of M cycles (for example, 50 cycles) so that the user determines whether to enter the charge protection mode. If the user needs to go to an environment where the terminal device of the user cannot be charged, the battery of the terminal device may be charged to full. If the user does not require that the battery is charged to full, the charge protection mode may be selected, that is, the charging of the battery is stopped after the charge volume reaches the set charge volume. The set charge volume is 70%-90% of the full charge volume. Preferably, the set charge volume is 80%-90% of the full charge volume.

Further, the apparatus for controlling charge further includes:

a third processing module configured to generate a prompt for each increase of Y cycles after the charge cycle counts reach a second preset threshold (in an example, the second preset threshold is a fixed value), so that the user determines whether to enter the battery repair charge mode, where the charge current of the battery is limited to a set charge quantity for battery charge in the battery repair charge mode.

In this example, the user may select a current-limited charge or a normal charge or the like based on its own requirements. Through the intelligent charge strategy selection, the user may repair the battery by using a lower current for charging on a condition that a relatively long charge time is allowed, so as to prolong the use life of the battery. Further, the use life of a mobile phone having the battery is prolonged and the user experiences are greatly improved.

Y is a natural number which is same as or different from M. In a case that there is no limitation both in the charge time and the charge environment, the user may determine whether to perform a full charge according to the method of controlling charge of the present disclosure. Meanwhile, the user may determine whether to perform a current-limited charge to repair the battery, in other words, the battery may reach a non-full charge, such as 90% of the full charge, in a manner of current-limited charging selected by the user. In this way, a use life of the battery is greatly improved without affecting the use of the user, thereby solving the problem that the battery is not durable after a long time of use.

For the apparatus examples, since it substantially corresponds to the method examples, a reference may be made to the partial descriptions of the method examples. The apparatus examples described above are merely illustrative, where the units described as separate components may or may not be physically separated, and the components displayed as units may or may not be physical units, that is, may be located at one place, or may be distributed to a plurality of network units. Some or all of the modules may be selected according to actual requirements to achieve the objectives of the solutions of the present disclosure. Those of ordinary skill in the art may understand and carry out them without creative work.

Correspondingly, the present disclosure further provides an apparatus for controlling charge, including:

one or more processors; and a memory storing processor-executable instructions.

The one or mere processors are configured to:

determine charge cycle counts of a battery;

obtain a set charge cut-off current corresponding to the charge cycle counts based on a preset charge strategy; and adjust a charge cut-off current of the battery according to the set charge cut-off current corresponding to the charge cycle count to control a charge volume of the battery.

Figure 5:
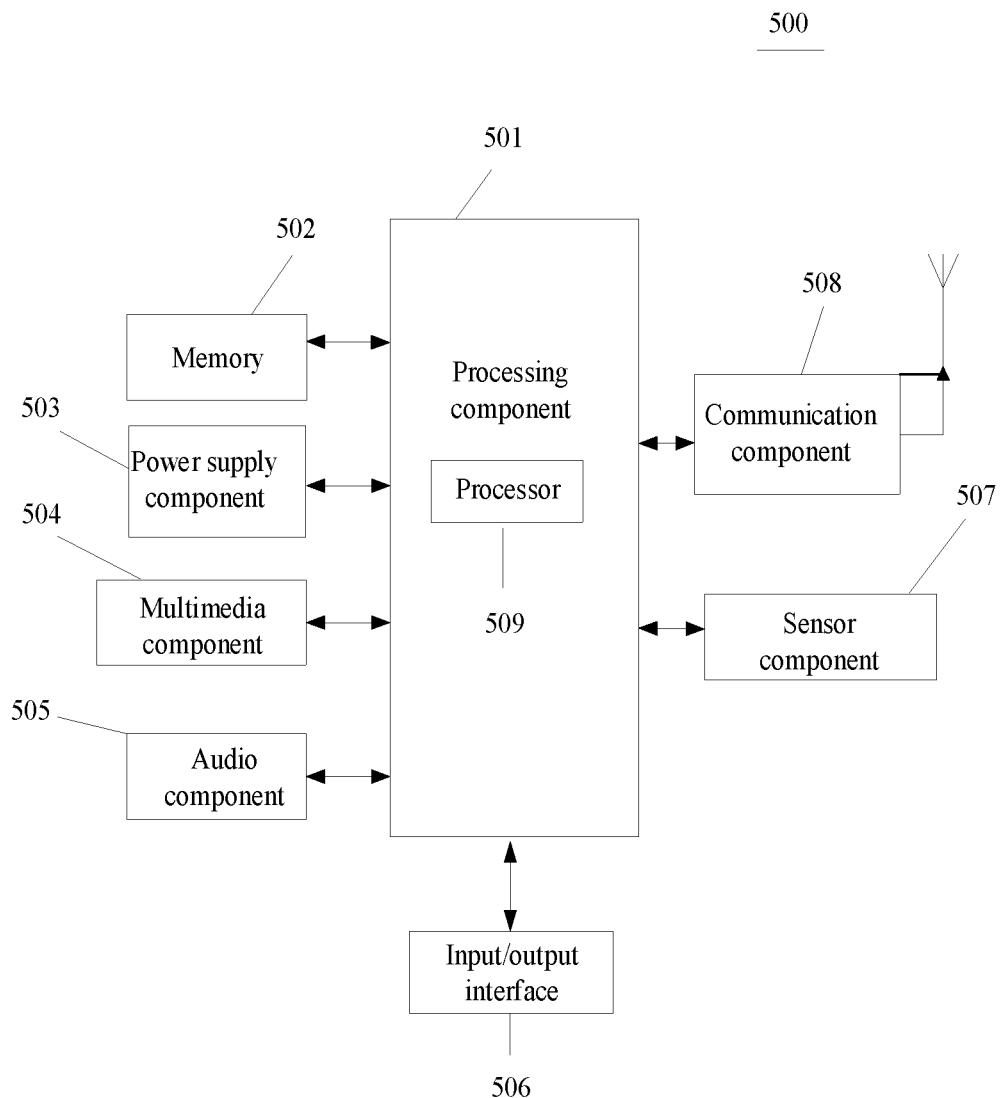
FIG. 5 is a schematic diagram illustrating a structure of an apparatus for controlling charge according to an example of the present disclosure.

FIG. 5 is a schematic diagram illustrating a structure of an apparatus for controlling charge according to an example of the present disclosure. As shown in FIG. 5, the apparatus 500 for controlling charge according to an example may be a terminal such as a computer, a mobile phone, a digital broadcast terminal, a message transceiver, a game console, a tablet device, a medical device, a fitness device, a personal digital assistant.

As shown in FIG. 5, the apparatus 500 for controlling charge may include one or more of the following components: a processing component 501, a memory 502, a power supply component 503, a multimedia component 504, an audio component 505, an input/output (I/O) interface 506, a sensor component 507 and a communication component 508.

The processing component 501 generally controls the overall operations of the apparatus 500, such as operations associated with display, phone calls, data communications, camera operations, and recording operations. The processing component 501 may include one or more processors 509 to execute instructions to complete all or part of the steps of the above methods. In addition, the processing component 501 may include one or more modules which facilitate the interaction between the processing component 501 and other components. For example, the processing component 501 may include a multimedia module to facilitate the interaction between the multimedia component 504 and the processing component 501.

The memory 502 is to store various types of data to support the operation on the apparatus 500. Examples of such data include instructions for any application or method operated on the apparatus 500, contact data, telephone directory data, messages, pictures, videos, and so on. The memory 502 may be implemented by any type of volatile or non-volatile memory devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a disk or a CD.

The power supply component 503 supplies power for different components of the apparatus 500. The power supply component 503 may include a power supply management system, one or more power supplies, and other association components for generating, managing and distributing power for the apparatus 500.

The multimedia component 508 includes a screen providing an output interface between the apparatus 500 and a user. In some examples, the screen may include a Liquid Crystal Display (LCD) and a Touch Panel (TP). In some embodiments, an organic light-emitting diode (OLED) display or other types of displays can be adopted.

If the screen includes a touch panel, the screen may be implemented as a touch screen to receive input signals from the user. The touch panel includes one or more touch sensors to sense touches, swipes and gestures on the touch panel. The touch sensors may not only sense the boundary of a touch or swipe operation but also sense a duration and a pressure associated with the touch or swipe operation. In some examples, the multimedia component 508 may include a front camera and/or a rear camera. The front camera and/or rear camera may receive external multimedia data when the apparatus 500 is in an operating mode, such as a shooting mode or a video mode. Each of the front camera and the rear camera may be a fixed optical lens system or may be capable of focal length and optical zoom.

The audio component 505 is to output and/or input an audio signal. For example, the audio component 505 includes a microphone (MIC). When the apparatus 500 is in an operable mode, such as a call mode, a record mode and a voice recognition mode, the microphone is to receive an external audio signal. The received audio signal may be further stored in the memory 502 or sent via the communication component 508. In some examples, the audio component 505 further includes a speaker for outputting an audio signal.

The I/O interface 506 provides an interface between the processing component 501 and a peripheral interface module. The peripheral interface module may be a keyboard, a click wheel, a button and the like. These buttons may include but not limited to, a home button, a volume button, a start button and a lock button.

The sensor component 507 includes one or more sensors to provide status assessments of various aspects for the apparatus 500. For example, the sensor component 507 may detect the on/off state of the apparatus 500, and relative positioning of component, for example, the component is a display and a keypad of the apparatus 500. The sensor component 507 may also detect a change in position of the apparatus 500 or a component of the apparatus 500, a presence or absence of the contact between a user and the apparatus 500, an orientation or acceleration/deceleration of the apparatus 500 and a change in temperature of the apparatus 500. The sensor component 507 may include a proximity sensor to detect the presence of a nearby object without any physical contact. The sensor component 507 may further include an optical sensor, such as a Complementary Metal-Oxide-Semiconductor (CMOS) or Charged Coupled Device (CCD) image sensor which is used in imaging application. In some examples, the sensor component 507 may further include an acceleration sensor, a gyroscope sensor, a magnetic sensor, a pressure sensor, or a temperature sensor.

The communication component 508 is to facilitate wired or wireless communication between the apparatus 500 and other devices. The apparatus 500 may access a wireless network based on a communication standard, such as WIFI, 2G or 3G, or a combination thereof. In an example, the communication component 508 may receive a broadcast signal or broadcast-related information from an external broadcast management system via a broadcast channel. In an example, the communication component 508 may also include a Near Field Communication (NFC) module for promoting short-range communication. For example, the NFC module may be implemented based on Radio Frequency Identification (RFID) technology, Infrared Data Association (IrDA) technology, Ultra Wide Band (UWB) technology, Bluetooth (BT) technology and other technology.

In an example, the apparatus 500 may be implemented by one or more Application-Specific Integrated Circuits (ASICs), Digital Signal Processors (DSPs), Digital Signal Processing Devices (DSPDs), Programmable Logical Devices (PLDs), Field Programmable Gate Arrays (FPGAs), controllers, microcontrollers, microprocessors or other electronic elements for performing the method as described above.

In an example, there is further provided a non-transitory computer readable storage medium including instructions, such as the memory 502 including instructions. The above instructions may be executed by the processor 509 of the apparatus 500 to complete the above method. For example, the non-transitory computer readable storage medium may be a Read Only Memory (ROM), a Random-Access Memory (RAM), a CD-ROM, a magnetic tape, a floppy disk, and optical data storage device and the like.

When the instructions in the storage medium are executed by the processor, the apparatus 500 is caused to perform the above method of controlling charge.

Those of ordinary skill in the art will understand that the above described modules/units can each be implemented by hardware, or software, or a combination of hardware and software. Those of ordinary skill in the art will also understand that multiple ones of the above described modules/units may be combined as one module/unit, and each of the above described modules/units may be further divided into a plurality of sub-modules/sub-units.

In the present disclosure, it is to be understood that the terms "lower," "upper," "center," "longitudinal," "transverse," "length," "width," "thickness," "upper," "lower," "front," "back," "left," "right," "vertical," "horizontal,"

"top," "bottom," "inside," "outside," "clockwise," "counter-clockwise," "axial," "radial," "circumferential," "column," "row," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the present disclosure, a first element being "on," "over," or "below" a second element may indicate direct contact between the first and second elements, without contact, or indirect through an intermediate medium, unless otherwise explicitly stated and defined.

Moreover, a first element being "above," "over," or "at an upper surface of" a second element may indicate that the first element is directly above the second element, or merely that the first element is at a level higher than the second element. The first element "below," "underneath," or "at a lower surface of" the second element may indicate that the first element is directly below the second element, or merely that the first element is at a level lower than the second feature. The first and second elements may or may not be in contact with each other.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a Read-Only Memory (ROM), a Random-Access Memory (RAM), a Compact Disc Read-Only Memory (CD-ROM), a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures. For example, the devices can be controlled remotely through the Internet, on a smart phone, a tablet computer or other types of computers, with a web-based graphic user interface (GUI).

A computer program (also known as a program, software, software application, app, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a mark-up language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode) display, other flexible configuration, or any other monitor for displaying information to the user and a keyboard, a pointing device, e.g., a mouse, trackball, etc., or a touch screen, touch pad, etc., by which the user can provide input to the computer.

Other types of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In an example, a user can speak commands to the audio processing device, to perform various operations.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features may be described above as acting in certain combinations and even initially claimed as such, one or more features from a claimed combination can in some cases be excised from the combination, and the claimed combination may be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A method of controlling charge, comprising: determining charge cycle counts of a battery; obtaining a set charge cut-off current corresponding to the charge cycle counts based on a preset charge strategy; and adjusting a charge cut-off current of the battery according to the set charge cut-off current corresponding to the charge cycle counts to control a charge volume of the battery; wherein the set cut-off current is a current value when the battery reaches full charge state or a certain charge state, further comprising: after the charge cycle counts reach a first preset threshold, for each increase of M cycles, generating a first prompt, so that a user determines whether to enter a battery charge protection mode based on the first prompt, wherein M is a natural number; and in response to that the battery charge protection mode is entered, stopping charging the battery after the charge volume of the battery reaches a set charge volume in the battery charge protection mode, wherein the set charge volume is smaller than a full charge volume of the battery.

2. The method according to claim 1, wherein obtaining the set charge cut-off current corresponding to the charge cycle counts based on the preset charge strategy comprises:
for each increase of N cycles, increasing the set charge cut-off current by X milliamperes based on an initial charge cut-off current, wherein N and X are respectively natural number;
wherein, the set charge cut-off current reaches a maximum value after the charge cycle counts reach a threshold.

3. The method according to claim 1, wherein the set charge volume is 70%-90% of the full charge volume.

4. The method according to claim 1, further comprising:
after the charge cycle counts reach a second preset threshold, for each increase of Y cycles, generating a second prompt, so that the user determines whether to enter a battery repair charge mode based on the second prompt, wherein Y is a natural number; and
limiting a charge current of the battery to a set charge current in the battery repair charge mode, so that the battery is charged in the set charge current.

5. The method according to claim 4, wherein the set charge current is lower than the charge current of the battery in a battery non-repair charge mode.

6. An apparatus implementing the method according to claim 1, comprising a processing circuit configured to prolong a use life of the battery by performing an intelligent charge strategy selection.

7. The apparatus according to claim 6, wherein the apparatus is configured to, after the charge cycle counts of the battery reach a first preset threshold counts, generate a prompt for each increase of M cycles for the user to determine whether to enter a battery charge protection mode.

8. The apparatus according to claim 7, wherein the apparatus is configured to charge the battery to full, or enter a battery charge protection mode upon user selection selected.

9. The apparatus according to claim 8, wherein in the battery charge protection mode, the charging of the battery is stopped after the charge reaches a set charge volume.

10. The apparatus according to claim 9, wherein the set charge volume is 70%-90% of the full charge volume.

11. The apparatus according to claim 9, wherein the set charge volume is 80%-90% of the full charge volume.

12. The apparatus according to claim 11, wherein the apparatus is configured to, after the charge cycle counts reach a second preset threshold, a prompt is generated for each increase of Y cycles for the user to determine whether to enter a battery repair charge mode, a charge current of the battery is limited to a set charge current for battery charge, wherein the current is the charge current of the battery, and the set charge current is lower than the charge current of the battery in a battery non-repair charge mode.

13. The apparatus according to claim 12, wherein the apparatus is a mobile phone or a computer, wherein the battery is an internal battery of the mobile phone or computer, and wherein the processing circuit is a built-in processor of the mobile phone or computer.

14. An apparatus for controlling charge, comprising: one or more processors; and a memory storing processor-executable instructions; wherein the one or more processors are configured to: determine charge cycle counts of a battery; obtain a set charge cut-off current corresponding to the charge cycle counts based on a preset charge strategy; and adjust a charge cut-off current of the battery according to the obtained set charge cut-off current corresponding to the charge cycle count to control a charge volume of the battery; wherein the set cut-off current is a current value when the battery reaches full charge state or a certain charge state, wherein the one or more processors are configured to: after the charge cycle counts reach a first preset threshold, for each increase of M cycles, generate a first prompt, so that a user determines whether to enter a battery charge protection mode based on the first prompt, wherein M is a natural number; and in response to that the battery charge protection mode is entered, stop charging the battery after the charge volume of the battery reaches a set charge volume in the battery charge protection mode, wherein the set charge volume is smaller than a full charge volume of the battery.

15. The apparatus according to claim 14, wherein the one or more processors are configured to:
for each increase of N cycles, increase the set charge cut-off current by X milliamperes based on an initial charge cut-off current, wherein N and X are respectively natural number;
wherein, the set charge cut-off current reaches a maximum value after the charge cycle counts reach a threshold.

16. The apparatus according to claim 14, wherein the set charge volume is 70%-90% of the full charge volume.

17. The apparatus according to claim 14, wherein the one or more processors are configured to:
after the charge cycle counts reach a second preset threshold, for each increase of Y cycles, generate a second prompt, so that the user determines whether to enter a battery repair charge mode based on the second prompt, wherein Y is a natural number; and
limit a charge current of the battery to a set charge current in the battery repair charge mode, so that the battery is charged in the set charge current.

18. The apparatus according to claim 17, wherein the set charge current is lower than the charge current of the battery in a battery non-repair charge mode.

* * * * *